US008577628B2

(12) United States Patent
Caicedo et al.

(10) Patent No.: US 8,577,628 B2

(45) Date of Patent: Nov. 5, 2013

(54) SYSTEM AND METHOD FOR MODAL IDENTIFICATION USING SMART MOBILE SENSORS

(75) Inventors: Juan Caicedo, Columbia, SC (US); Johannio Marulanda Casas, Cali (CO)

(73) Assignee: University of South Carolina, Columbia, SC (US)

(*) Notice: Subject to any disclaimer, the term of this patent is extended or adjusted under 35 U.S.C. 154(b) by 371 days.

(21) Appl. No.: 12/758,321

(22) Filed: Apr. 12, 2010

(65) Prior Publication Data

US 2010/0262390 A1 Oct. 14, 2010

Related U.S. Application Data

(60) Provisional application No. 61/212,410, filed on Apr. 10, 2009.

(51) Int. Cl.

*G01N 3/38* (2006.01)
*G01N 3/32* (2006.01)
*G01N 3/34* (2006.01)
*G06F 3/01* (2006.01)

(52) U.S. Cl.

USPC .................. 702/56; 702/53; 702/54; 702/183

(58) Field of Classification Search

USPC ......... 702/39, 42, 45, 56, 108, 182, 185, 187, 702/189, 190; 73/574, 579; 188/378

See application file for complete search history.

(56) References Cited

U.S. PATENT DOCUMENTS 4,901,575 A 2/1990 Bohannan et al.
4,956,999 A 9/1990 Bohannan et al.
5,000,564 A * 3/1991 Ake .............................. 356/3.16
5,255,565 A * 10/1993 Judd et al. ........................ 73/579
5,327,358 A * 7/1994 Stubbs ............................ 702/36
5,377,358 A 12/1994 Nakamura
5,533,399 A * 7/1996 Gibson et al. ................... 73/579
5,774,376 A 6/1998 Manning
6,116,389 A * 9/2000 Allaei ........................... 188/378
6,192,758 B1 2/2001 Huang
6,212,486 B1 4/2001 Huang et al.
6,779,404 B1 8/2004 Brincker et al.
6,845,671 B2 * 1/2005 Hull ................................ 73/574
6,996,480 B2 2/2006 Giurgiutiu et al.

(Continued)

OTHER PUBLICATIONS

A.B. Stanbridge. and D. J, Ewins, "Modal Testing Using a Scanning Laser Doppler Vibrometer," Mechanical Systems and Signal Processing, 13 (2), 1999, pp. 255-270.

(Continued)

*Primary Examiner* — Marc Armand
*Assistant Examiner* — Felix Suarez
(74) *Attorney, Agent, or Firm* — Dority & Manning, P.A.

(57) ABSTRACT

Systems and methods for determining spatially dense dynamic properties of a structure are disclosed. In particular, spatially dense mode shapes are determined using acceleration records collected when one or several sensors are moving. The mobile sensor gathers vibration response data for the structure as the mobile sensor moves over the structure. The vibration response data is used to extract a fine grid of modal coordinates with a reduced number of sensors and without requiring mode shape expansion. The high spatially dense mode shapes can be included as part of accurate numerical models for the structure that can be used for a variety of purposes, such as damage detection, earthquake engineering, wind engineering, and other suitable purposes.

20 Claims, 6 Drawing Sheets

200

210 Receive First Acceleration Data from a Stationary Sensor

220 Move a Mobile Sensor Over At Least a Portion of the Structure

230 Receive Second Acceleration Data from the Mobile Sensor

240 Determine a Natural Frequency for the Structure Using the First Acceleration Data 250 Determine a Mode Shape for the Structure Based the Second Acceleration Data

(56) References Cited

U.S. PATENT DOCUMENTS

| | | | |
|---|---|---|---|
| 7,024,315 | B2 | 4/2006 | Giurgiutiu |
| 7,346,461 | B2 | 3/2008 | Huang et al. |
| 2005/0072234 | A1 | 4/2005 | Zhu et al. |

OTHER PUBLICATIONS

A. B. Stanbridge. A. Z. Kahn and D. J Erwins, "Modal Testing Using Impact Excitation and a Scanning LDV," Shock and Vibration, 7(2), 2000, pp. 91-100.

A. B. Stanbridge, M. Martarelli, and D. J. Ewins, "Measuring area vibration mode shapes with a continuous-scan LDV." Measurement, 35, 2004, pp. 181-189.

D. Zhu, X Yi., Y Wang, K.-M Lee, and J. Guo, "A mobile sensing system for structural health monitoring: design and validation," Smart Materials and Structures, 19(5) 055011, 2010, pp. 1-16.

* cited by examiner

SYSTEM AND METHOD FOR MODAL IDENTIFICATION USING SMART MOBILE SENSORS

PRIORITY CLAIM

This application claims the benefit of priority of U.S. Provisional Patent Application No. 61/212,410, filed Apr. 10, 2009, which is incorporated by reference herein in its entirety for all purposes.

BACKGROUND

The present disclosure relates generally to modal identification techniques for detecting dynamic properties of structures and more particularly to systems and methods for determining dynamic properties of structures with increased spatial resolution using one or more mobile sensors that collect vibration response data as they move through the structure.

Civil structures, such as bridges, buildings, and other structures, are extraordinarily important for society. Strategies to maintain or improve existing structural designs typically require numerical models of the structure to analyze behavior. The numerical models can be used to evaluate structure performance under specific conditions such as heavy loading, earthquake motion, wind loading, human activity, or other conditions. Developing accurate numerical models of existing structures is key to evaluate vulnerability, detecting damage, studying retrofit alternatives, predicting the useful life of structures, and performing other useful purposes. An accurate numerical model has the capability to reproduce the response of the real structure having parameters with a realistic physical meaning.

One way to validate an existing model is to compare the dynamic response of the numerical model with the actual response of the structure. Furthermore, the experimental response of the structure can be used to update or improve those numerical models. System identification and modal analysis techniques are used to determine modal parameters of a structure, including natural frequencies, mode shapes, and modal damping ratios. Different types of dynamic tests or excitations can be applied to the structure to characterize its behavior, such as free vibration, sinusoidal excitation, impulse excitation, and resonance tests. The use of ambient vibration, generally caused by traffic, wind, and microtremors, under normal operating conditions for the structure, can be a preferred approach for civil structures such as bridges.

In a traditional modal identification system, a finite number of sensors are placed at strategic points. For instance, FIG. 1 illustrates an exemplary modal identification system 50 that includes a plurality of sensors 52, 54, 56, and 58 placed at key locations on structure 60. The coordinates of the modes shapes of structure 60 are calculated only at the location of sensors 52, 54, 56, and 58. As shown in FIG. 2, this creates a low spatial resolution mode shape. As illustrated, curve 70 illustrates the expected mode shape of the structure 60, while curve 72 represents the identified mode shape obtained with the data from the stationary sensors.

One approach to addressing low spatial resolution is to install additional sensors. However, the cost of instrumentation and installation of dense sensor networks can be prohibitive. Smart wireless sensors have been proposed for large instrumentation systems. The relative lower cost of the sensors and easier installation of the wireless sensors makes them more suitable for dense sensor networks. However, there are still fundamental challenges faced by this technology such as battery life and overload of the communication network.

Another approach to addressing low spatial resolution is mode shape expansion. Mode shape expansion is used to calculate the complete mode shape based on the information of discrete points. Exemplary mode shape expansion techniques include i) spatial interpolation techniques, which use a finite element model geometry to expand the mode shape; ii) properties interpolation techniques, which use the finite element model properties for the expansion; and iii) error minimization techniques, which intend to reduce the error between the expanded and the analytical mode shapes using projection methods. Mode shape expansion can introduce errors due to, for instance, discrepancies in the location of the sensors in the actual structure and numerical models, measurement errors, modeling errors, and other factors.

Another existing modal identification technique involves the use of Laser Doppler Vibrometers (LDVs) in a continuously scanning mode. A laser beam from the LDV is focused to a surface of interest and the velocity of the addressed point is measured using the Doppler shift between the incident and the reflected beam. Vibration measurements along a line can be made by continuously passing the laser beam over the surface of a vibrating structure. The single signal collected from the LDV at uniform or sinusoidal speed can be used for the identification of a polynomial that describes the operational mode shape of a structure. A continuous scan LDV (CSLDV) can be used to derive curvature equations of a structure and to calculate the stress and strain distributions for the structure. For instance, CSLDV can be used in conjunction with random excitation of a structure to identify operational deflection shapes for maintaining a polynomial shape assumption.

The use of LDV or CSLDV technology in the identification of mode shapes for structures, and in particular for civil infrastructure such as bridges and buildings, poses several challenges. For instance, the usable distance of the lasers is typically too small for most civil applications and line of sight is often needed. In addition, LDV and CSLDV systems are relatively expensive. Moreover, LDV and CSLDV measurements can be distorted due to the exposure of a structure to environmental factors, leading to reduced reliability.

Thus, there is a need for a system and method for modal identification that can be implemented using a reduced number of sensors and that can provide for increased spatial resolution of the mode shape that overcomes the above-mentioned disadvantages.

SUMMARY

Aspects and advantages of the invention will be set forth in part in the following description, or may be obvious from the description, or may be learned through practice of the invention.

One exemplary embodiment of the present disclosure is directed to a method for determining dynamic properties of a structure subject to an excitation. The method includes receiving first vibration response data associated with the structure from a first sensor. The method further includes moving a second sensor over at least a portion of the structure and receiving second vibration response data associated with the structure from the second sensor. The second vibration response data is collected by the second sensor as the second sensor is moving over at least a portion of the structure. The method further includes determining a mode shape for the structure based at least in part on the first vibration response data and the second vibration response data.

In a particular embodiment, the first vibration response data can be monitored as a function of time. The second vibration response data can be monitored as a function of time and space because the second sensor is moving as it collects the second vibration response data.

Another exemplary embodiment of the present disclosure is directed to a system for determining dynamic properties of a structure subject to an excitation. The system includes a stationary sensor attached to the structure. The stationary sensor is configured to monitor first vibration response data for the structure. The system further includes a mobile sensor. The mobile sensor is configured to be moved across at least a portion of the structure. The mobile sensor is configured to monitor second vibration response data for the structure as the mobile sensor is moved across the at least a portion of the structure. The system further includes a processor associated with at least one of the first sensor or the second sensor. The processor is configured to receive the first vibration response data and the second vibration response data. The processor can be programmed to determine a mode shape for the structure based at least in part on the first vibration response data and the second vibration response data.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
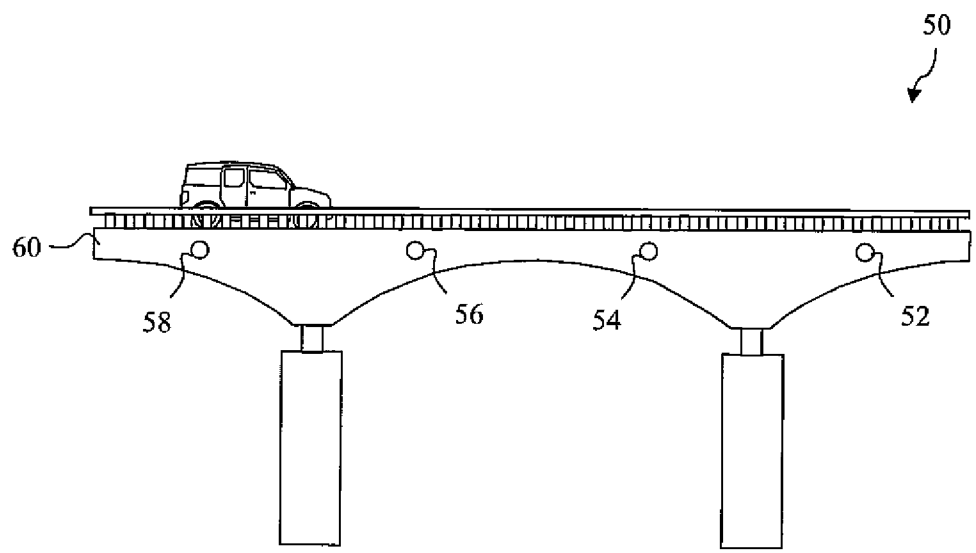
FIG. 1 depicts a known system for determining dynamic properties of a structure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for determining dynamic properties of a structure. Embodiments of the present disclosure use a mobile sensor for modal identification of the structure. The mobile sensor gathers vibration response data from the structure as the mobile sensor moves across the structure. For instance in a particular embodiment, the mobile sensor continuously moves across the structure and records vibration response data for the structure as the sensor is continuously moving across the structure. In this manner, vibration response data obtained from the mobile sensor can be monitored or recorded as a function of time and space because the mobile sensor is moving as it collects the vibration response data. The vibration response data is used to extract a fine grid of modal coordinates with a reduced number of sensors and without requiring mode shape expansion. By requiring less sensors, less data is also required, simplifying sensor communication requirements and power requirements. The high spatially dense mode shapes can be used to update numerical models of the structure that can be used for a variety of purposes, such as structural health monitoring, damage prognosis, earthquake engineering, wind engineering, and other suitable purposes.

Figure 3:
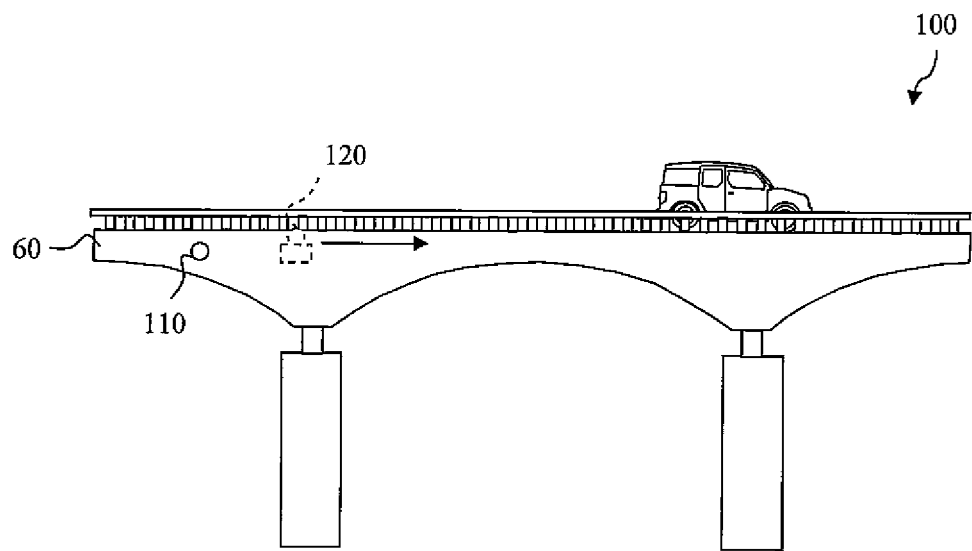
FIG. 3 depicts a system for determining dynamic properties of a structure according to an exemplary embodiment of the present disclosure.

FIG. 3 illustrates a system 100 according to an exemplary embodiment of the present disclosure. As illustrated, system 100 includes a stationary sensor 110 that is attached to structure 60. While one stationary sensor 110 is illustrated in FIG. 3, those of ordinary skill in the art, using the disclosures provided herein, should understand that any number of stationary sensors can be used as desired. Stationary sensor 110 can communicate data, such as vibration response data, for structure 60 to a user interface 130 or to a mobile sensor 120. Mobile sensor 120 is configured to move across at least a portion of structure 60. For instance, in a particular embodiment, mobile sensor 120 can be installed on beams that form a part of structure 120. The mobile sensor 120 can move from one side of the beam to the next during the data collection process. As mobile sensor 120 moves across structure 60, mobile sensor 120 collects data, such as vibration response data, and can be configured to communicate the data to the stationary sensor 110 or to a user interface 130. The data collected by stationary sensor 110 and mobile sensor 120 can be used to determine dynamic properties of structure 60, such as mode shapes for structure 60.

Figure 2:
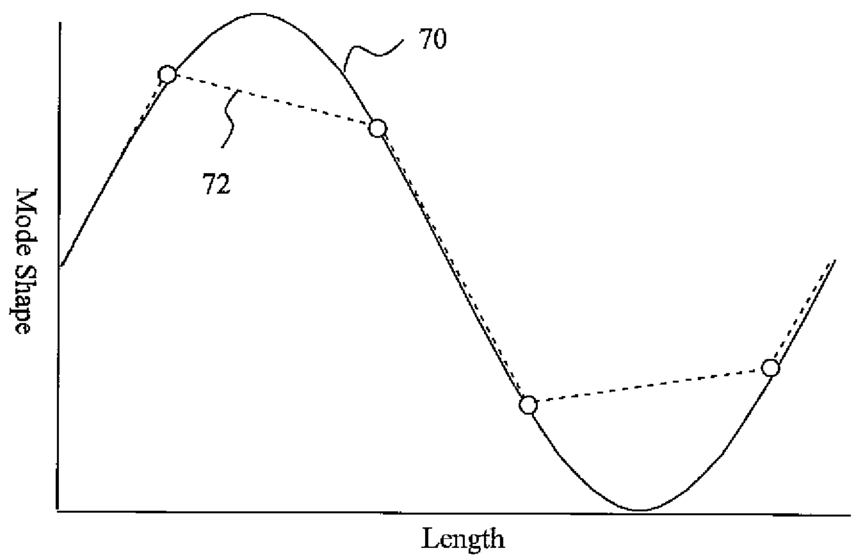
FIG. 2 depicts an exemplary graphical representation of a low spatial resolution mode shape determined from the system for determining dynamic properties of a structure of FIG. 1.
Figure 4:
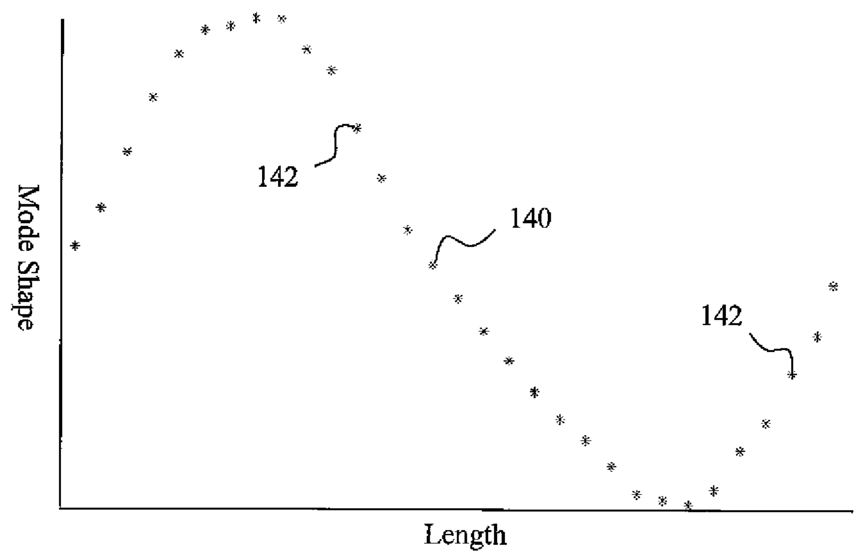
FIG. 4 depicts an exemplary graphical representation of a high spatial resolution mode shape determined according to an exemplary embodiment of the present disclosure.

As illustrated in FIG. 4, vibration response data collected from stationary sensor 110 and mobile sensor 120 can be used to generate a plurality of data points 142 as the sensor moves across structure 60. Data points 142 are used to determine a high spatially dense mode shape 140 for structure 60. High spatially dense mode shape 140 more accurately represents the actual mode shape of structure 60 when compared to mode shape 72 of FIG. 2 determined from use of discrete stationary sensors attached in structure 60.

Figure 5:
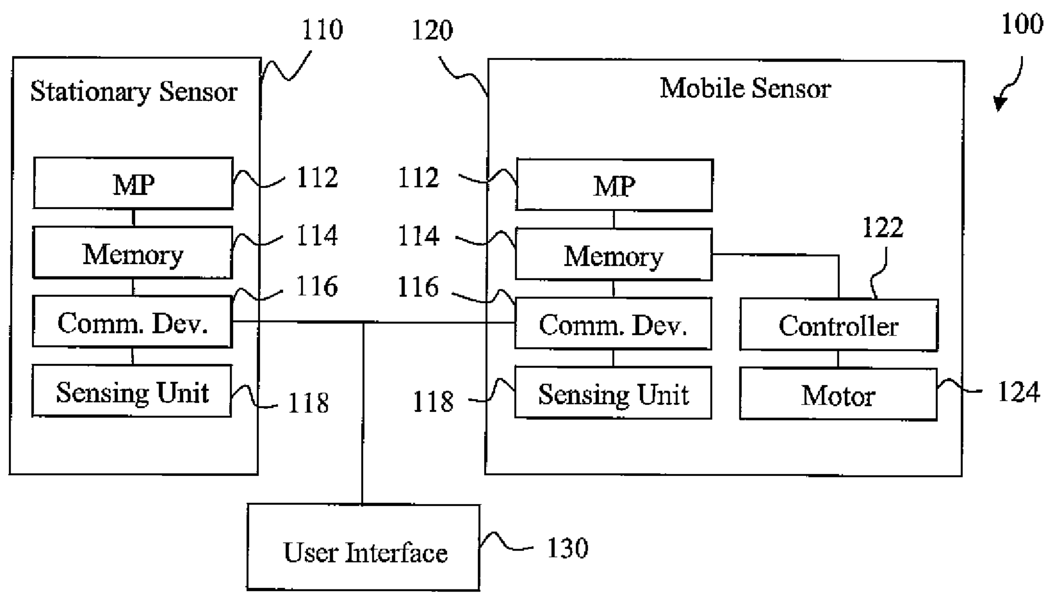
FIG. 5 depicts a block diagram of an exemplary system for determining dynamic properties of a structure according to an exemplary embodiment of the present disclosure.

FIG. 5 illustrates a block diagram of system 100 according to an exemplary embodiment of the present disclosure. System 100 includes one or more stationary sensors 110 and one or more mobile sensors 120. Stationary sensor 110 and mobile sensor 120 can include any type of sensor or device for monitoring and providing data concerning the dynamic properties of a structure. In a particular embodiment, stationary sensor 110 and mobile sensor 120 are smart wireless sensors that are commercially available. As illustrated, stationary sensor 110 and mobile sensor 120 can each include a processor 112, a memory 114, a communication device 116, and a sensing unit 118.

Sensing units 118 for stationary sensor 110 and mobile sensor 120 can be used to measure vibration response information and other information associated with structure 118. Sensing units 118 can include a variety of sensing devices suitable for modal identification and monitoring purposes, such as accelerometers, and temperature, humidity, light and strain sensors. Those of ordinary skill in the art, using the disclosures provided herein, should understand that a variety of different types of sensing units 118 can be used without deviating from the scope of the present disclosure.

Data collected by stationary sensor 110 and mobile sensor 120 can be saved on memory 114 for processing at processor 112. Data can be communicated between stationary sensor 110, mobile sensor 120, and user interface 130 using communication device 116. In a particular embodiment, communication device 116 is a wireless communication device suitable for transmitting data between stationary sensor 110, mobile sensor 120, and user interface 130.

Mobile sensor includes a controller 122 that is used to command a motor 124 that displaces the mobile sensor 120 on the structure. The controller 120 can receive commands from the processor 112 associated with mobile sensor 120, such as speed of motion. The controller 122 can send information back to processor 112 such as location and actual velocity of motion for mobile sensor 120.

Processor 112 of mobile sensor 120 or stationary sensor 110 can be used to perform the calculation to identify modal parameters from the data collected by mobile sensor 120 and stationary sensor 110. Processor 112 of mobile sensor 120 or stationary sensor 110 can include any suitable type or arrangement of processing devices. In some embodiments, some or all aspects of processor 112 can be implemented as separate logical units using the same computing device or devices. Some aspects of processor 112 can be implemented by software or specialized hardware (such as application-specific integrated circuits.)

User interface 130 can be in communication with mobile sensor 120 and stationary sensor 110 to exchange information with mobile sensor 120 and stationary sensor 110 and to manipulate and control various aspects of system 100. User interface 130 can be any device, such as a general purpose computing device, specialized computing device, or other suitable device. User interface 130 can also include a processor configured to determine mode shapes from vibration response data received from stationary sensor 110 and mobile sensor 120. A user can control system 100 through one or more input devices associated with user interface 130, such as a keyboard, mouse, voice interface, touch screen, key pad, etc. Manipulation may include specifying parameters for identification, such as sampling frequencies, number of points of the mode shape, speed of the mobile sensor, path of the mobile sensor, etc.

In a particular implementation of system 100, stationary sensor 110 collects first vibration response data and processes it locally to identify various modal properties of a structure, such as natural frequencies and damping ratios for the structure. The stationary sensor 110 can communicate the first vibration response data and identified modal properties to the mobile sensor 120. The mobile sensor 120 processes the data received from stationary sensor 110 and the vibration response data collected by mobile sensor 120 to identify spatially dense mode shapes using the techniques disclosed herein. The mobile sensor 120 and the stationary sensor 110 can communicate the data, modal properties, and mode shapes to user interface 130.

Figure 6:
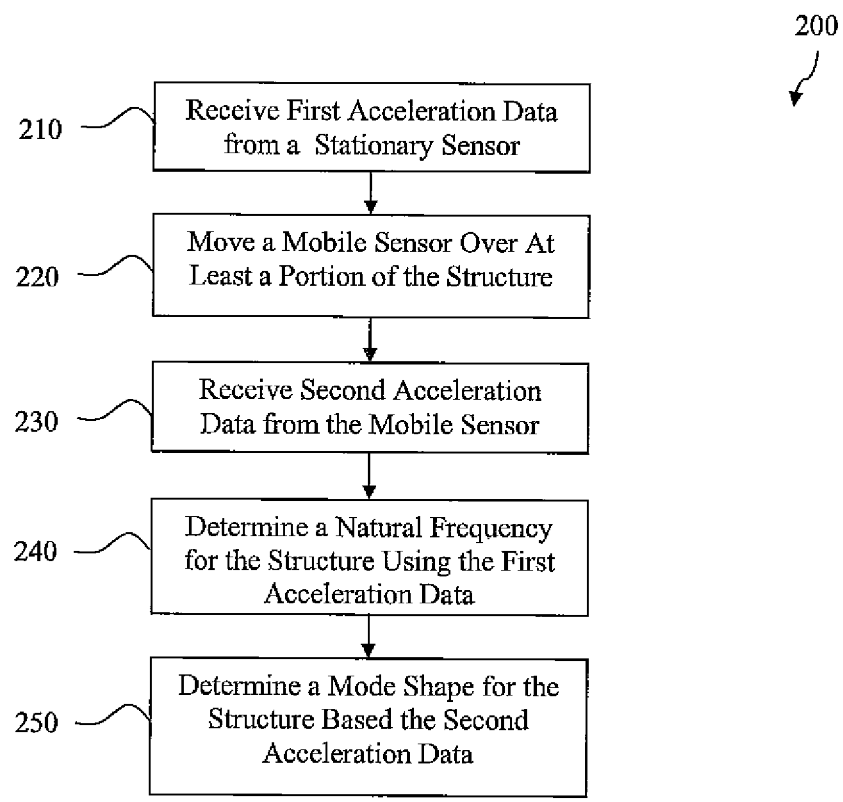
FIG. 6 depicts a flow chart of an exemplary method for determining dynamic properties of a structure according to an exemplary embodiment of the present disclosure.

FIG. 6 depicts a block diagram of an exemplary method 200 that can be executed by system 100 or otherwise performed in accordance with exemplary embodiments of the present disclosure. The method 200 is used to determine dynamic properties of the structure subjected to an excitation. The excitation can be a sinusoidal excitation, impulse excitation, ambient excitation, or other suitable excitation.

At 210, the method 200 includes receiving first vibration response data from the stationary sensor of the structure in response to the excitation. At 220, a mobile sensor is moved along a path over at least a portion of the structure. The particular path and speed of the mobile sensor over the at least a portion of the structure can be adjusted to accommodate varying circumstances. At 230, as the mobile sensor is moving over at least a portion of the structure, the method 200 includes receiving second vibration response data from the structure.

At 240, the method 200 determines a natural frequency of the structure using the first vibration response data from the stationary sensor. The natural frequency can be determined using a processor associated with stationary sensor, mobile sensor, user interface, or other remote computing device. Determining a natural frequency of the structure using the first vibration response data can include using an identification technique such as a Stochastic Subspace Identification (SSI) technique; Natural Excitation Technique (NExT); Eigensystem Realization Algorithm Technique (ERA); or other suitable technique. Those of ordinary skill in the art, using the disclosures provided herein, should understand that a variety of different methods and techniques exist for determining the natural frequency of a structure from vibration response data obtained from stationary sensors and that any such technique can be used without deviating from the scope or spirit of the present disclosure.

At 250, the method 200 determines a mode shape for the structure using the first vibration response data and the second vibration response data. The mode shape can be determined using a processor associated with the stationary sensor, mobile sensor, user interface, or other remote computing device. Exemplary methodology for determining a mode shape for the structure using the first vibration response data and the second vibration response data will now be set forth.

Figure 7:
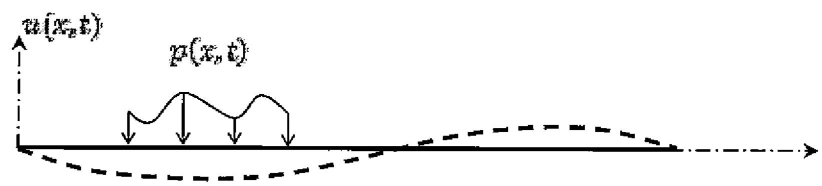
FIG. 7 depicts a one-dimensional linear time invariant system in the x-axis subjected to a dynamic excitation.

The acceleration response of a one-dimensional linear time invariant system in the x-axis subjected to a dynamic excitation as illustrated in FIG. 7 is described by:

$$\ddot{u}(x,t)=\sum_{n=1}^{\infty}\phi_n(x)\ddot{q}_n(t) \tag{1}$$

where $\Phi_n(x)$ is the nth natural mode of vibration and $\ddot{q}_n(t)$ is the acceleration response of the nth mode in generalized coordinates.

In general, if the information is properly organized, the mode shapes of the system can be identified using the equation $$\Phi=Q^{-1}U \tag{2}$$

where the matrix $\Phi$ contains the modal coordinates, the matrix is Q a function of the type of excitation, and U is a matrix containing the measured response recorded by the sensor(s). The following will provide a discussion of three exemplary embodiments of the present disclosure each tailored for a different type of excitation, including sinusoidal excitation, impulse excitation, and ambient vibration.

Sinusoidal Excitation

The nth steady state response in generalized coordinates of the one-dimensional system shown in FIG. 7, created by a simple harmonic load with frequency $\omega$ is $$\ddot{q}_n(t)=A_n\sin(\omega t-\theta_n) \tag{3}$$

where $A_n$ is the nth acceleration amplitude and $\theta_n$ is the nth phase lag, a function of the modal damping ratio and the modal frequency ratio. If the response of the system is measured with a mobile sensor travelling at a constant speed v, the measured acceleration response in geometric coordinates can be written as a function of time only $$\ddot{u}(t)=\sum_{n=1}^{\infty}\phi_n(vt)\ddot{q}_n(t) \tag{4}$$

Considering the embodiment where the external force is in resonance with the rth natural mode of vibration, the contribution to the response of the rth mode in generalized coordinates is $$\ddot{q}_r(t)=A_r\sin(\omega_r t-\pi/2) \tag{5}$$

and the measured acceleration or displacement response of the system can be written as $$\ddot{u}(t)=\phi_r(vt)A_r\sin(\omega_r t-\pi/2)\sum_{\substack{n=1\\ n\neq r}}^{\infty}\phi_n(vt)A_n\sin(\omega_r t-\theta_n) \tag{6}$$

The measured acceleration response or displacement response is an infinite summation of sine functions with the same frequency but different amplitudes and phases. The amplitudes of the sinusoidal terms vary with time due to the mode shape (or with the position of the sensor). For each sinusoidal term different to the rth mode the phase $\theta_n$ is constant and different to $\pi/2$. Assuming that the influence of the non-resonant modes is negligible, the identification of the rth mode could be performed as $$\phi_r(x)=\phi_r(vt)\approx\frac{\ddot{u}(t)}{\sin\left(\omega_r t-\frac{\pi}{2}\right)} \tag{7}$$

In this case, $$U=\ddot{u}(t),\ Q=\sin\left(\omega_r t-\frac{\pi}{2}\right)$$

and $\Phi=\phi_r(x)$ in Equation (2) above.

Figure 8:
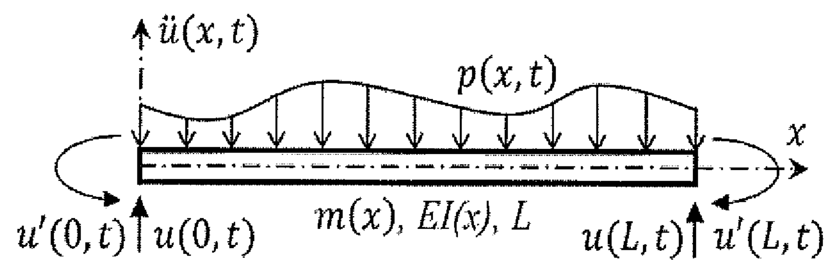
FIG. 8 depicts a simply supported Euler-Bernoulli beam used for a numerical evaluation of exemplary embodiments of the present disclosure.

Numerical evaluation for this exemplary embodiment will be set forth using the simply supported Euler-Bernoulli beam illustrated in FIG. 8. The equation of motion of the undamped beam subjected to external dynamic forces is:

$$m(x)\frac{\partial^2 u}{\partial t^2}+\frac{\partial^2}{\partial x^2}\left[EI(x)\frac{\partial^2 u}{\partial x^2}\right]=p(x,t) \tag{8}$$

where the flexural rigidity, EI(x), and the mass per unit length, m(x), may vary with x. For a uniform simply supported beam, the nth natural vibration mode shape and its corresponding natural frequency are:

$$\phi_n(x)=\sin\left(\frac{n\pi x}{L}\right)\ \ \&\ \ \omega_n=\frac{n^2\pi^2}{L^2}\sqrt{\frac{EI}{m_l}} \tag{9}$$

where L is the total length of the beam, E is the elasticity modulus of the material, I is the moment of inertia of the cross section, and $m_l$ is its constant mass per unit length.

The identification of the mode shapes using Equation (7) poses two main challenges: i) the influence of the non-resonant modes and ii) the synchronization between the acceleration record and the sinusoidal function in the denominator of the right hand side of Equation (7). The acceleration response of the beam described by Equation (1) is caused by the external forces, p(x, t). The acceleration response of the nth mode in generalized coordinates for a concentrated sinusoidal load applied at a distance $x_o$ from the axis origin, with amplitude $p_o$ and frequency $\omega$, including the modal damping, is $$\ddot{q}_n(t)=-\frac{p_o\phi_n(x_o)}{K_n}\frac{\omega^2}{\sqrt{(1-\beta_n^2)^2+(2\zeta_n\beta_n)^2}}\sin\left(\omega t-\tan^{-1}\left(\frac{2\zeta_n\beta_n}{1-\beta_n^2}\right)\right) \tag{10}$$

where $K_n=\omega_n^2M_n$ is the n-th generalized stiffness, $M_n=\int_O^L m(x)[\phi_n(x)]^2dx$, is the nth generalized mass, $\zeta_n$ is the nth modal damping ratio, and $\beta_n=\omega/\omega_n$ is the n-th modal frequency ratio.

The influence of the non-resonant modes can be reduced using only the peak values of the $\sin(\omega_r t-\pi/2)$ function in Equation (10). Therefore the rth mode can be identified as $$\phi_r(x)=\phi_r(vt)=\frac{\ddot{u}(t)}{\sin\left(\omega_r t-\frac{\pi}{2}\right)};\quad \text{for } t=\frac{k\pi}{\omega_r};\ k=1,2,3\ \ldots \tag{11}$$

The methodology according to this exemplary embodiment of the present disclosure has the potential to correctly identify the modes of vibration based on known or determined natural frequency and damping ratios. A phase lag $\xi$ between the acceleration record and the sinusoidal function in the denominator of Equation (10) can be present and cause errors in the identification. Including this phase in Equation (11) is obtained $$\phi_r(x) = \phi_r(vt) = \frac{\ddot{u}(t)}{\sin\left(\omega_r t - \frac{\pi}{2} + \xi\right)}; \quad \text{for } t = \frac{k\pi}{\omega_r}; k = 1, 2, 3 \ldots \tag{12}$$

The influence of the phase lag $\xi$ can be reduced by synchronizing the acceleration record such that the maximum accelerations correspond to the values of t on Equation (12), i.e. having a value of $\xi$ close to zero.

Impulse Excitation

The nth acceleration response in generalized coordinates of the one-dimensional system shown in FIG. 7 due to an impulse with amplitude $p_o$ located at $x_o$ from the axis origin is:

$$\ddot{q}_n(t) = \frac{p_o\phi_n(x_o)}{M_n}\left[\frac{\omega_{dn}(2\zeta_n^2 - 1)}{1-\zeta_n^2}e^{-\zeta_n\omega_n t}\sin(\omega_{dn}t) - 2\zeta_n\omega_n e^{-\zeta_n\omega_n t}\cos(\omega_{dn}t)\right] \tag{13}$$

where $\zeta_n$ is the n-th damping ratio and $\omega_{dn}=\omega_n\sqrt{1-\zeta_n^2}$ is the nth damped natural frequency.

If the response of the system is discretized with the same number of points, K, in space and time, and N modes are considered, the response can be written as:

$$\ddot{u}(x,t) = \begin{bmatrix} \phi_1(x_1) & & \phi_n(x_1) & & \phi_N(x_1) \\ \vdots & & \vdots & & \vdots \\ \phi_1(x_k) & \ldots & \phi_n(x_k) & \ldots & \phi_N(x_k) \\ \vdots & & \vdots & & \vdots \\ \phi_1(x_K) & & \phi_n(x_K) & & \phi_N(x_K) \end{bmatrix} \begin{bmatrix} \ddot{q}_1(t_1) & \ldots & \ddot{q}_1(t_k) & \ldots & \ddot{q}_1(t_K) \\ & & \vdots & & \\ \ddot{q}_n(t_1) & \ldots & \ddot{q}_n(t_k) & \ldots & \ddot{q}_n(t_K) \\ & & \vdots & & \\ \ddot{q}_N(t_1) & \ldots & \ddot{q}_N(t_k) & \ldots & \ddot{q}_N(t_K) \end{bmatrix} \tag{14}$$

or $$U^*_{K\times K} = \Phi^*_{K\times N}Q^*_{N\times K} \tag{15}$$

If the response is recorded with a sensor moving along the system with a constant velocity, v, measured data correspond to the diagonal of matrix U*, that is $$u_{ii}=\phi_1(x_i)\ddot{q}_1(t_i)+\ldots+\phi_n(x_i)\ddot{q}_n(t_i)+\ldots+\phi_N(x_i)\ddot{q}_n(t_i) \tag{16}$$

where $x_i=vt_i$.

Assuming that the natural frequencies and damping ratios have been identified previously, the exponential and sinusoidal functions in Equation 13 can be evaluated, and the first term, $$\frac{p_o\phi_n(x_o)}{M_n},$$

can be treated as an unknown constant affecting the mode shape amplitude. Therefore, if the available information is organized properly, the modal coordinates can be calculated as:

$$\Phi=Q^{-1}U \tag{2}$$

Ambient Excitation

A preferred approach for modal identification in civil structures is to use ambient vibration data because its experimental collection does not require stopping the operation of the structure or having specialized equipment to test the structure. The following methodology formulation is built upon the fact that the correlation function between two response signals is the solution of the homogeneous equation of motion, as described in for instance in James, G. H., T. G. Came, and J. P. Lauffer, 1993, The Natural Excitation Technique (NExT) for Modal Parameter Extraction from Operating Stuctures, *Modal-Analysis-the International Journal of Analytical and Experimental Modal Analysis* 10(4):260-277, on the development of the Natural Excitation Technique (NExT).

A matrix formulation of the cross-correlation function between the displacement responses at $x=x_i$ and $x=x_j$ due to a white noise force at $x=x_k$, of the one-dimensional beam shown in FIG. 7, evaluated at a time separation of T is:

$$R_{ij}(T)=\alpha\Phi_j G(T)\Phi_i \tag{17}$$

where $\alpha$ is a constant, $\Phi_j$ and $\Phi_i$ are vectors with the modal coordinates of all modes at $x=x_j$ and $x=x_i$ respectively, and G(T) is a matrix where the value at row s and column r is defined by the equation $$G_{sr}(T) = \frac{\phi_{rk}\phi_{sk}}{M_r M_s\omega_{dr}}e^{-\zeta_r\omega_r T}[H_{rs}\cos(\omega_{dr}T) + F_{rs}\sin(\omega_{dr}T)] \tag{18}$$

The discrete time cross and power spectral density functions for two stationary random processes, x(t) and y(t), can be estimated as:

$$S_{xx}(\omega) = \frac{1}{M}\sum_{m=1}^{M}R_{xx}(m)e^{\frac{-j\omega m}{M}} \tag{19}$$

$$S_{yy}(\omega) = \frac{1}{M}\sum_{m=1}^{M}R_{yy}(m)e^{\frac{-j\omega m}{M}} \tag{20}$$

$$S_{yx}(\omega) = \frac{1}{M}\sum_{m=1}^{M}R_{xy}(m)e^{\frac{-j\omega m}{M}} \tag{21}$$

where $R_{xx}$ is the auto correlation function for x(t), $R_{yy}$ is the auto correlation function for y(t) and $R_{xy}$ is the cross correlation function for x(t) and y(t).

Using the matrix formulation of the correlation function between the displacement responses of a linear time invariant system at $x=x_i$ and $x=x_j$ (Equation (17)), the auto and cross power spectral density functions can be written as $$S_{ii}(\omega) = \frac{1}{M}\sum_{m=1}^{M} R_{ii}(m)e^{\frac{-c\omega m}{M}} = \frac{1}{M}\sum_{m=1}^{M} \alpha\Phi_i G(m)\Phi_i e^{\frac{-c\omega m}{M}} = \frac{\alpha}{M}\Phi_i\sum_{m=1}^{M} G(m)\Phi_i e^{\frac{-c\omega m}{M}} \quad (22)$$

$$S_{ji}(\omega) = \frac{1}{M}\sum_{m=1}^{M} R_{ij}(m)e^{\frac{-c\omega m}{M}} = \frac{1}{M}\sum_{m=1}^{M} \alpha\Phi_j G(m)\Phi_i e^{\frac{-c\omega m}{M}} = \frac{\alpha}{M}\Phi_j\sum_{m=1}^{M} G(m)\Phi_i e^{\frac{-c\omega m}{M}} \quad (23)$$

where c is the complex variable.

Finally, the quotient between the cross and auto spectral density functions for a particular frequency would be $$K_{ji} = \frac{S_{ji}}{S_{ii}} = \frac{\Phi_j}{\Phi_i} \quad (24)$$

Assuming that the modal coordinates at the reference location $x=x_i$ are all equal to one, the modal coordinates at $x=x_j$ can be calculated directly as $K_{ji}=\Phi_{ji}$. This formulation can be used for the identification of modal coordinates using stationary sensors. In this embodiment, $U=S_{ji}$, $Q=S_{ii}$, and $\Phi=\Phi_{ji}$ in Equation (2).

In previously known methodologies, it was assumed that both responses, at $x=x_i$ and $x=x_j$, are stationary random processes, which is not the case for the response recorded using a mobile sensor. However, because the non-stationary response from the mobile sensor can be divided into stationary segments, the auto and cross spectral density functions can be calculated for segments of both records using the discrete time-dependent or short-time Fourier Transform.

A spectrogram is a three-dimensional representation of the time-averaged Fourier transforms over contiguous time segments of a random process. Assuming that the process x(t), with time length T, is sampled for a discrete Fourier transform analysis with a sampling interval of $\Delta T$, and that the number of data values for each Fourier transform computation is N, each Fourier transform will cover a time segment of $T_s=N\,\Delta T$, so that the process length is divided into $A=T/T_s$ segments. The collection of time averaged Fourier transforms for these segments is organized on matrices as $$SP_x(\omega, t) = \begin{bmatrix} X_{11} & \dots & X_{1\alpha} & \dots & X_{1A} \\ \vdots & & \vdots & & \vdots \\ X_{\beta 1} & \dots & X_{\beta\alpha} & \dots & X_{\beta A} \\ \vdots & & \vdots & & \vdots \\ X_{B1} & \dots & X_{B\alpha} & \dots & X_{BA} \end{bmatrix} \quad (25)$$

-continued $$SP_y(\omega, t) = \begin{bmatrix} Y_{11} & \dots & Y_{1\alpha} & \dots & Y_{1A} \\ \vdots & & \vdots & & \vdots \\ Y_{\beta 1} & \dots & Y_{\beta\alpha} & \dots & Y_{\beta A} \\ \vdots & & \vdots & & \vdots \\ Y_{B1} & \dots & Y_{B\alpha} & \dots & Y_{BA} \end{bmatrix} \quad (26)$$

where $SP_x$ and $SP_y$ are the distribution of the short-time Fourier transforms of x(t) and y(t); $X_{\beta\alpha}$ and $Y_{\beta\alpha}$ are the Fourier transforms of x(t) and y(t) for the time segment $\alpha$ and the frequency block $\beta$, respectively. The size of the distribution, or in other words the number of time segments A and frequency blocks B, depend on the parameters of the algorithm used to calculate the Fourier transform. Typically the parameters are the number of data values, the length of the window and the length of the window overlap.

Using the definition of the spectral density functions via the finite Fourier transforms of two stationary random processes $$S_{xx}(\omega) = \frac{1}{T}X*(\omega)X(\omega) \quad (27)$$

$$S_{yy}(\omega) = \frac{1}{T}Y*(\omega)Y(\omega) \quad (28)$$

$$S_{yx}(\omega) = \frac{1}{T}Y*(\omega)X(\omega) \quad (29)$$

a time-frequency distribution of the spectral density functions can be formulated in terms of the short-time Fourier transform as $$S_{xx}(\omega, t) = \frac{1}{T}SP_x^*(\omega, t)\cdot\times SP_x(\omega, t) \quad (30)$$

$$S_{yy}(\omega, t) = \frac{1}{T}SP_y^*(\omega, t)\cdot\times SP_y(\omega, t) \quad (31)$$

$$S_{yx}(\omega, t) = \frac{1}{T}SP_y^*(\omega, t)\cdot\times SP_x(\omega, t) \quad (32)$$

where the symbol * denotes complex conjugate and ·× denotes an element by element multiplication.

Finally, a time-frequency or, in this case, a space-frequency distribution of the modal coordinates with reference to the modal coordinates at $x=x_i$ can be calculated as $$K_{ji}(\omega,t)=S_{ji}(\omega,t)\cdot/S_{ii}(\omega,t)=\Phi_{ji}(\omega,t) \quad (33)$$

where the symbol ·/ denotes an element by element division. In this case, $U=S_{ji}(\omega, t)$, $Q=S_{ii}(\omega, t)$ and $\Phi=\Phi_{ji}(\omega, t)$ in Equation (2). The space-frequency distribution representation is a complex matrix but only the real part is used because only real modes are being considered. Because the natural frequencies have been determined or are known, the identified mode shapes are extracted from the space-frequency representation for the corresponding natural frequencies.

The proposed technique has the potential to correctly identify the modes of vibration using data without noise and assuming that the natural frequencies are known or have been determined. The accuracy of the identified modes can be affected due to errors on the identified natural frequencies, the location of the stationary sensor, the sampling frequency, the FFT parameters and the presence of noise in the signals.

EXAMPLE

An exemplary validation was performed using the exemplary methodology for ambient excitation. A 7.010 m (23 ft) length W14×53 simply supported steel beam was used to experimentally validate the technique. The beam supports were located at 0.152 m (0.5 ft) from each. A Brüel & Kjær electro dynamic shaker was used to excite the beam vertically with a 100-Hz band-limited white noise signal generated using a National Instruments 6062E data acquisition card. The shaker was clamped to the bottom of the beam at 1.118 m (44 in) from end A.

Figure 9:
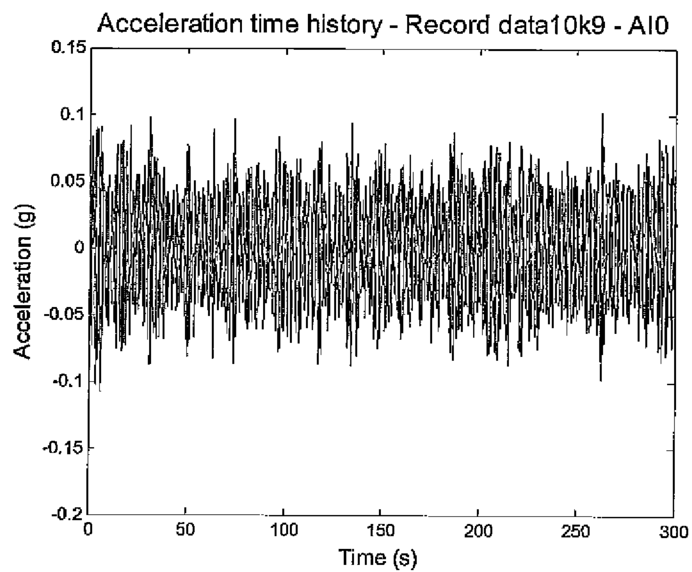
FIG. 9 depicts a graphical representation of an exemplary representative vibration response data associated with a baseline mode shape identification obtained during a validation of an exemplary embodiment of the present disclosure.
Figure 10:
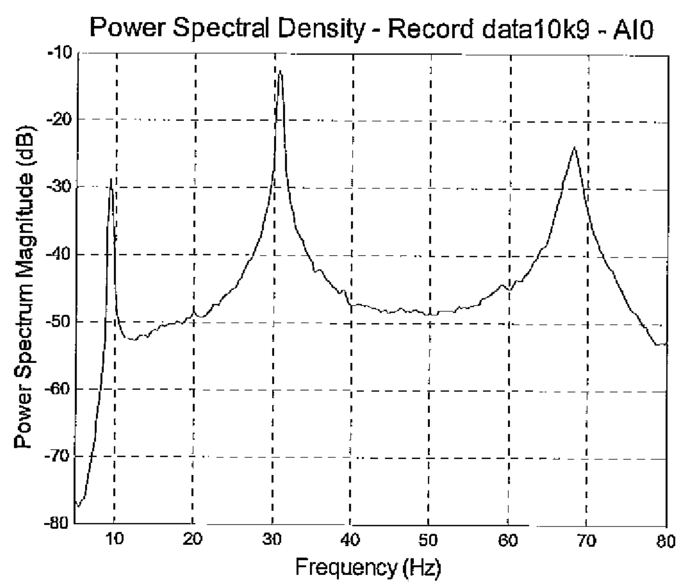
FIG. 10 depicts a graphical representation of an exemplary power spectral density for the vibration response data depicted in FIG. 9 after the data was resampled to 160 Hz.

A baseline modal identification was performed using the Stochastic Subspace Identification method. Forty three locations, one every 0.152 m (0.5 ft), were selected to place stationary sensors and identify the natural frequencies, damping ratios and mode shapes of the beam. A representative acceleration record is shown in FIG. 9 and its corresponding power spectral density is shown in FIG. 10 after the data was resampled to 160 Hz. The first three natural frequencies appear clearly in the power spectral density plot of FIG. 10 but the limitations on the shaker at frequencies lower than 10 Hz produce a low amplitude for the first mode.

The identification process using the Stochastic Subspace Identification method was repeated several times to calculate mean values and standard deviations for the natural frequencies, damping ratios and mode shapes of the beam. An algorithm to automatically recognize the true poles from the ones created by noise and numerical errors was used. The final results are summarized in Table 1 below. Errors in the identification of the first mode shape are due to the 10 Hz low limit of the shaker. The asymmetry of the modes along the axis of the beam is caused by the additional mass of the shaker's attachment.

TABLE 1

Identified natural frequencies and damping ratios

| Mode | Frequency (Hz) | Standard Deviation Frequency (Hz) | Damping (%) | Standard Deviation Damping (%) |
|---|---|---|---|---|
| 1 | 9.448 | 0.075 | 1.089 | 1.455 |
| 2 | 30.758 | 0.100 | 0.258 | 0.214 |
| 3 | 67.959 | 0.521 | 0.472 | 0.253 |

A mobile sensor was built for the experimental validation of MIMS and included a small cart and a wireless sensor. The wireless sensor consists of an Imote2 wireless sensor node platform from Crossbow and a SHM-A sensor board from the Illinois Structural Health Monitoring Project (ISHMP) (2009), all powered by a Crossbow's IBB2400 battery board. The SHM-A is a sensor board designed to interface with the Imote2 sensor platform tailored to structural health monitoring applications (ISHMP 2009). The SHM-A board includes a triaxial accelerometer as well as light, temperature and humidity sensors, and a 4-channel analog to digital converter for external signals.

Figure 11:
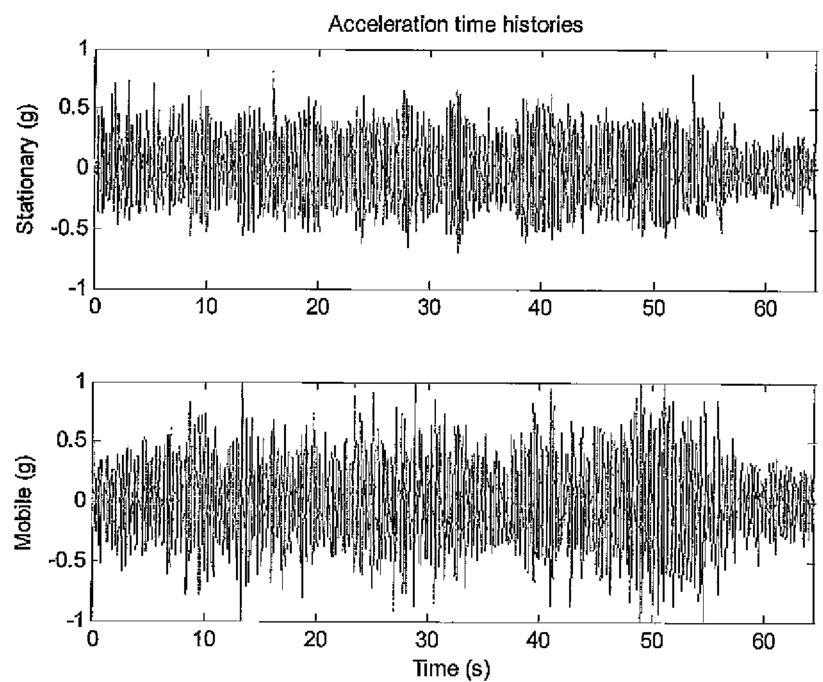
FIG. 11 depicts vibration response data obtained during a validation of an exemplary embodiment of the present disclosure.

A second smart stationary sensor was attached to the beam at 5.486 m (18 ft) from end A to use it as a reference stationary sensor. In addition to the excitation provided by the shaker, the beam was also excited using one rubber mallet hitting randomly at the same location of the shaker. This additional excitation was used to increase the signal-to-noise ratio of the mobile sensor. Data was collected from the smart sensors at a sampling rate of 280 Hz. The acceleration time histories from the stationary sensor and the mobile sensor are shown in FIG. 11.

Figure 12:
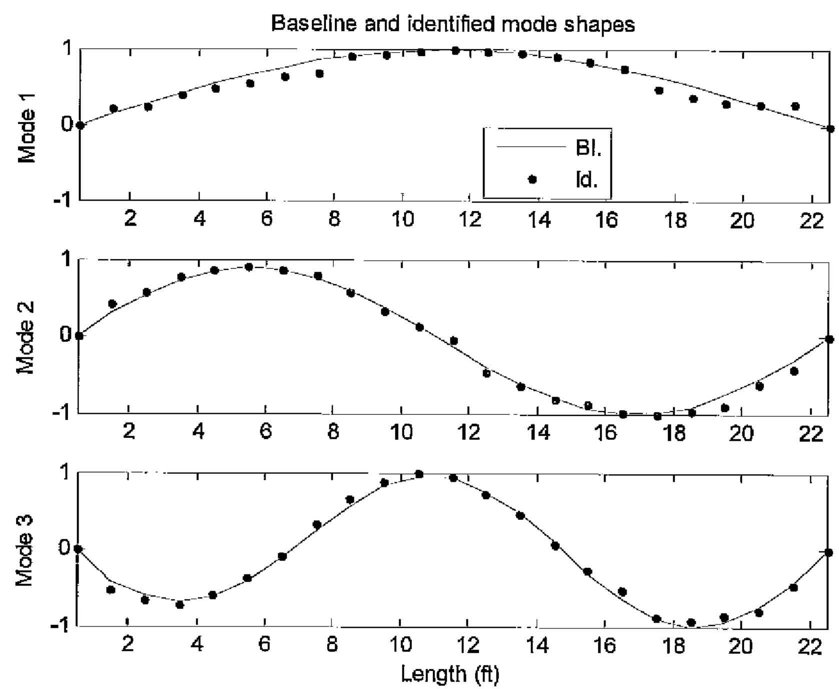
FIG. 12 depicts baseline and identified mode shapes obtained during a validation of an exemplary embodiment of the present disclosure.

The first step in the methodology of this example was the identification of the natural frequencies of the structure. In this example, the first three natural frequencies were identified using an Stochastic Subspace Identification method with the signal from the stationary sensor. The identified natural frequencies are 9.271, 30.689 and 67.921, which differ 1.87%, 0.23% and 0.06% from the results of the baseline identification, respectively. The corresponding mode shapes were identified and are shown in FIG. 12, together with the baseline identified modes using the Stochastic Subspace Identification method. Twenty-one modal coordinates were targeted using the methodology according to this exemplary embodiment of the present disclosure. The results are verified by comparing the mode shapes obtained with the proposed technique with those of a traditional modal identification technique using all stationary sensors. The similarity between the two mode shapes are measured using the Modal Assurance Criteria (MAC). MAC is a number between 0 and 1. MAC values, defined as the correlation between two vectors, between the baseline and the identified modes using smart mobile sensing units are 0.988, 0.993 and 0.992. MAC values of 0 indicate the two vectors being different, and values of 1 indicating a correct identification.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for determining dynamic properties of a structure subject to an excitation, the method comprising:

receiving at a processor first vibration response data associated with the structure from a first sensor;

moving a second sensor configured to collect vibration response data continuously over at least a portion of the structure in a direction defined by a length of the structure;

receiving at the processor second vibration response data associated with the structure, the second vibration response data being collected by the second sensor as the second sensor is continuously moving over the at least a portion of the structure; and determining with the processor a mode shape for the structure based at least in part on the first vibration response data and the second vibration response data.

2. The method of claim 1, wherein the first sensor is a stationary sensor attached to the structure.

3. The method of claim 1, wherein the first vibration response data is monitored as a function of time and the second vibration response data is monitored as a function of space and time.

4. The method of claim 1, wherein the method further comprises determining a natural frequency of the structure from the first vibration response data, and determining a mode shape for the structure based at least in part on the natural frequency determined from the first vibration response data.

5. The method of claim 1, wherein determining a mode shape for the structure based at least part on the first vibration response data and the second vibration response data comprises determining a mode shape according to the following:

$$\Phi = Q^{-1}U$$

where $\Phi$ is a matrix comprising modal coordinates for the mode shape, Q is determined as a function of the excitation, and U is a matrix comprising measured responses recorded by the first sensor and the second sensor.

6. The method of claim 5, wherein the excitation is a sinusoidal excitation and Q is defined as follows:

$$Q = \sin\left(\omega_r t - \frac{\pi}{2}\right)$$

where t is time and $\omega_r$ is the natural frequency of the rth mode shape of the structure.

7. The method of claim 6, wherein the method only uses the peak values of Q to reduce the effect of non-resonant modes.

8. The method of claim 1, wherein the excitation mode is an impulse excitation mode and the mode shape is determined based at least in part from:

$$\ddot{q}_n(t) = \frac{p_o\phi_n(x_o)}{M_n}\left[\frac{\omega_{dn}(2\zeta_n^2-1)}{1-\zeta_n^2}e^{-\zeta_n\omega_n t}\sin(\omega_{dn}t) - 2\zeta_n\omega_n e^{-\zeta_n\omega_n t}\cos(\omega_{dn}t)\right]$$

where $\zeta_n$ is the nth damping ratio, $\omega_{dn}=\omega_n\sqrt{1-\zeta_n^2}$ is the nth damped natural frequency and $$\frac{p_o\phi_n(x_o)}{M_n}$$

is a constant.

9. The method of claim 1, wherein the excitation mode is an ambient excitation mode and the mode shape is determined based at least in part using a short-time Fourier transform.

10. The method of claim 3, wherein the mode shape is determined based at least in part from a space-frequency distribution of the natural frequency.

11. The method of claim 1, wherein moving a second sensor continuously over at least a portion of the structure comprises moving the second sensor at a constant velocity over at least a portion of the structure.

12. A system for determining dynamic properties of a structure subject to an excitation, comprising:

a stationary sensor attached to the structure, the stationary sensor configured to monitor first vibration response data for the structure;

a mobile sensor configured to be continuously moved over at least a portion of the structure in a direction defined by a length of the structure, the mobile sensor configured to monitor second vibration response data for the structure as the mobile sensor is continuously moved over the at least a portion of the structure;

a processor associated with at least one of the stationary sensor or the mobile sensor, the processor configured to receive the first vibration response data and the second vibration response data, the processor further configured to determine a mode shape for the structure based at least in part on the first vibration response data and the second vibration response data.

13. The system of claim 12, wherein the processor is part of a user interface in communication with at least one of the first sensor or the second sensor.

14. The system of claim 12, wherein the processor is further configured to determine a natural frequency of the structure based at least in part on the first vibration response data.

15. The system of claim 12, wherein the processor is configured to determine the mode shape based at least in part from the following:

$$\Phi = Q^{-1}U$$

where $\Phi$ is a matrix comprising modal coordinates for the mode shape, Q is determined as a function of the excitation, and U is a matrix comprising measured responses recorded by the first sensor and the second sensor.

16. The system of claim 15, wherein the excitation is a sinusoidal excitation and Q is defined as follows:

$$Q = \sin\left(\omega_r t - \frac{\pi}{2}\right)$$

where t is time and $\omega_r$ is the natural frequency of the rth mode shape of the structure.

17. The system of claim 12, wherein the excitation mode is an impulse excitation mode and processor is configured to determine the mode based at least in part from:

$$\ddot{q}_n(t) = \frac{p_o\phi_n(x_o)}{M_n}\left[\frac{\omega_{dn}(2\zeta_n^2-1)}{1-\zeta_n^2}e^{-\zeta_n\omega_n t}\sin(\omega_{dn}t) - 2\zeta_n\omega_n e^{-\zeta_n\omega_n t}\cos(\omega_{dn}t)\right]$$

where $\zeta_n$ is the nth damping ratio, $\omega_{dn}=\omega_n\sqrt{1-\zeta_n^2}$ is the nth damped natural frequency and $$\frac{p_o\phi_n(x_o)}{M_n}$$

is a constant.

18. The system of claim 12, wherein the excitation mode is an ambient excitation mode and the processor is configured to determine the mode based at least in part using a short-time Fourier transform.

19. The system of claim 14, wherein the processor is configured to determine the mode shape based at least in part from a space-frequency distribution of the natural frequency.

20. A method for determining dynamic properties of a structure subject to a sinusoidal excitation, the method comprising receiving with a processor first vibration response data associated with the structure from a first sensor;

moving a second sensor configured to collect vibrational response data continuously over at least a portion of the structure in a direction defined by a length of the structure;

receiving at the processor second vibration response data associated with the structure, the second vibration response data collected by the second sensor as the second sensor is continuously moving over the at least a portion of the structure; and determining with the processor a mode shape for the structure based at least in part from the following:

$$\phi_r(x) = \phi_r(vt) = \frac{ii(t)}{\sin\left(\omega_r t - \frac{\pi}{2}\right)}; \text{ for } t = \frac{k\pi}{\omega_r}; \quad k = 1, 2, 3 \ldots$$

where $\phi_r(x)$ is the mode shape for rth mode of the structure, t is time, $\omega_r$ is the natural frequency of the rth mode shape, and ii(t) is the displacement response of the structure determined based at least in part from the first vibration response data and the second vibration response data.

* * * * *